(12) United States Patent
Wittmann

(10) Patent No.: US 10,737,639 B2
(45) Date of Patent: Aug. 11, 2020

(54) VEHICLE TRIM BAR AND FIXING ARRANGEMENT FOR A VEHICLE TRIM BAR

(71) Applicant: MOTHERSON INNOVATIONS COMPANY LIMITED, London (GB)

(72) Inventor: Peter Wittmann, Coburg (DE)

(73) Assignee: MOTHERSON INNOVATIONS CO. LTD., London (GB)

( * ) Notice: Subject to any disclaimer, the term of this patent is extended or adjusted under 35 U.S.C. 154(b) by 0 days.

(21) Appl. No.: 16/259,147

(22) Filed: Jan. 28, 2019

(65) Prior Publication Data

US 2019/0241131 A1     Aug. 8, 2019

(30) Foreign Application Priority Data

Feb. 2, 2018   (DE) .......................... 10 2018 201 649

(51) Int. Cl.
*B60R 13/02* (2006.01)
*B60R 13/04* (2006.01)
*B60R 13/06* (2006.01)

(52) U.S. Cl.
CPC .............. *B60R 13/04* (2013.01); *B60R 13/06* (2013.01)

(58) Field of Classification Search
CPC .......... B60R 13/00; B60R 13/04; B60R 13/06
USPC .................................................. 296/213, 1.08
See application file for complete search history.

(56) References Cited

U.S. PATENT DOCUMENTS 6,974,181 B2 * 12/2005 Mikkaichi ............... B60R 13/04
                                                         296/210
8,020,354 B2 *  9/2011 Scroggie ................. B60R 13/04
                                                         52/716.2
10,183,634 B1 *  1/2019 Karmo .................... B60R 13/04

* cited by examiner

*Primary Examiner* — Dennis H Pedder
(74) *Attorney, Agent, or Firm* — Maginot, Moore & Beck, LLP

(57) ABSTRACT

The present invention relates to a vehicle trim bar, in particular a roof trim bar, for covering a channel, in particular a roof channel, in a vehicle structure having a trim bar profile which is formed with a fixing leg for fixing the vehicle trim bar within the channel to the vehicle structure and a support leg for supporting the vehicle trim bar on a channel bottom of the channel, the support leg being formed with a support web which projects from the trim bar profile in a manner extending along a longitudinal direction of the vehicle trim bar and which is manufactured from a plastic material. Furthermore, the invention relates to a fixing arrangement for a vehicle, in particular a motor vehicle, comprising such a vehicle trim bar.

17 Claims, 1 Drawing Sheet

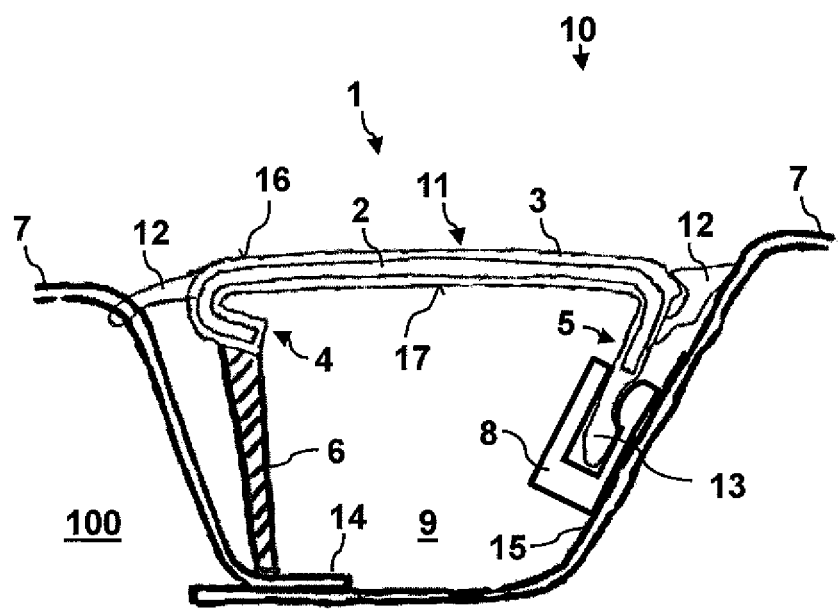

VEHICLE TRIM BAR AND FIXING ARRANGEMENT FOR A VEHICLE TRIM BAR

This application claims priority to German Application No. DE 102018201649.6, filed on Feb. 2, 2018. The entire contents of the above-mentioned patent applications are incorporated herein by reference as part of the disclosure of this U.S. application.

FIELD OF INVENTION

The present invention relates to a vehicle trim bar for covering a channel in a vehicle structure. The present invention further relates to a fixing arrangement for such a vehicle trim bar on a vehicle. Furthermore, the present invention relates to a vehicle comprising such a fixing arrangement. In particular, the present invention relates to a vehicle roof trim bar for covering a channel on a motor vehicle.

BACKGROUND

In automotive engineering, trim bars or strips are often used as trim parts for covering various recesses, ditches, gaps, channels, joints, or grooves in or on a vehicle body. For example, channel-shaped welding grooves between structural components of the vehicle body may be covered by means of trim strips or the like. In general, joint transitions between body parts or panels may be masked, i.e. closed or covered, by the use of trim bars, e.g. in the region of a vehicle roof, vehicle doors and/or mudguards, and so on. Such trim bars function both as a covering and protective element and as a decorative design component for the exterior design of a motor vehicle.

Trim bars are often configured as elongated, narrow strips comprising an approximately C-shaped cross-section. When assembly is performed, such a trim bar may be slid in and/or inserted into a channel, and latched into mounting brackets provided for this purpose. The legs of the C-shaped trim bar may be used as receiving pockets for complementary shaped latching arms or latching hooks of an appropriate mounting bracket. The mounting brackets themselves may, on the other hand, engage, on the vehicle body side, in corresponding wall openings of the vehicle within the channel. Normally, such mounting brackets also function as spacers within the respective channel in order to ensure a pressure-resistant and precisely fitting cover of the channel when using the trim bar.

A typical assembly process involves the installation of a large number of such spacers in a vehicle channel before the assembly of the trim may even start. This not only increases the throughput time in production, but also causes possible assembly inaccuracies during installation to due to the complex structure.

SUMMARY OF THE INVENTION

In view of the above, it is an object of the present invention to provide improved solutions for mounting a trim bar on a vehicle.

According to the present invention, this object is achieved by a vehicle trim bar comprising the features of patent claim 1, by a fixing arrangement comprising the features of patent claim 12, and/or by a vehicle comprising the features of patent claim 18.

Accordingly, it is provided:

A vehicle trim bar for covering a channel in a vehicle structure, comprising a trim bar profile which is formed with a fixing leg for fixing the vehicle trim bar within the channel to the vehicle structure and a support leg for supporting the vehicle trim bar on a channel bottom of the channel, wherein the support leg is formed with a support web which projects from the trim bar profile in a longitudinal direction of the vehicle trim bar and which is manufactured from a plastic material.

A fixing arrangement for a vehicle, in particular a motor vehicle, comprising a vehicle trim bar according to the present invention, and having a vehicle structure comprising a channel, wherein the vehicle trim bar is fixed to the vehicle structure by means of the fixing leg within the channel, and wherein the support leg supports the vehicle trim bar by means of the support web on a channel bottom of the channel.

A vehicle, in particular motor vehicle, comprising a fixing arrangement according to the present invention.

The present invention is based on the idea to configure a trim bar with an additional web manufactured from plastic material, in particular heat-resistant plastic, which positions the trim bar in the desired position within the channel or above the bottom of the channel. At the same time, the support web functions as a stabilizer against pressure loads caused by the trim bar. The actual mounting of the trim bar is achieved only by means of the fixing leg, e.g. by means of a connection to a wall of the channel proximate to the opening of the channel, wherein the connection may be standardized, for example. The particular advantage of a web manufactured from plastic material is that such a web may be cut to size or shortened without great effort, depending on the dimensions of the channel, and is thus adjustable height. For example, the support web may be manufactured with excess length, e.g. a length of 35 mm, wherein channels having a depth between 10 mm and 30 mm may be provided. For a precise fitting of the trim bar, the support web may now simply be cut to a certain height for the desired configuration, i.e. for example 10 mm, 20 mm or 30 mm, e.g. by means of water jet cutting, laser cutting, punching or a similar appropriate process. Thus, a standard trim bar may be used for a large number of body shell structures and channel geometries i.e. dimensions. Additional clips and/or spacers are no longer required, therefore simplifying assembly in general and leaving less room for possible assembly faults. Last but not least, reduction in cycle times and manufacturing costs may be achieved.

Additional advantageous embodiments and implementations result from the depending claims as well as from the description with reference to the figures in the drawing.

According to one embodiment, the support web may be adapted to have a variable height. For example, the support web may be provided with markings, perforations or other cutting aids which make it particularly simple and fault-free for cutting the support web to the desired height. Generally, an advantageous plastic material may be used for the support web, which offers an ideal compromise between stability and simple detachability, such that the support web is sufficiently strong and stiff to support the vehicle trim bar on the one hand, and may be cut to length easily and efficiently using cost-effective processes on the other hand.

According to another embodiment, the support web may be extruded onto the trim bar profile. For example, the trim bar profile may be prefabricated from a metal material such as aluminum, stainless steel or the like, a plastic material such as polyvinyl chloride (PVC), or a combination of such or similar materials. The support web may then be applied to the trim bar profile along the longitudinal direction of the vehicle trim bar by means of an extrusion die. For example, the support web may be manufactured from a thermoplastic such as PVC, polyethylene (PE), polypropylene (PP), polyamide (PA), polyoxymethylene (POM), polymethyl methacrylate (PMMA), polyurethane (PUR), thermoplastic elastomer (TPE), silicone (silicone rubber, SIK), or the like. In principle, the trim bar profile may also be manufactured from or comprise one or more of these materials. The materials of the trim bar profile and the support web may be advantageously chosen in such a way that an ideal compromise between temperature resistance, durability and weight saving is achieved. In alternative configurations, however, the trim bar profile and the support web may also be formed together in an integral manner, in particular of the same material.

According to another embodiment, the support web may substantially project at right angles from the trim bar profile. In particular, the support web may be arranged projecting from the channel bottom at an angle of 90°. In principle, however, the supporting web may also project from the trim bar profile at an angle of less than 90° or face towards the channel bottom. In a preferred exemplary embodiment, the trim bar profile may be substantially C-shaped, with the support web aligned at right angles to the web of the "C" shape.

According to another embodiment, the trim bar profile may be manufactured as an extrusion part. According to another embodiment, the trim bar profile may be manufactured as an extruded part. Alternatively or additionally, other manufacturing processes such as injection moulding or the like may be applied. In exemplary embodiments, the trim bar profile may be manufactured from a metal material, a metal alloy or a metallic material combination. For example, the trim bar profile may be manufactured entirely from aluminum, in particular. Likewise, the trim bar profile, in particular when completed, may be manufactured from a plastic material. In a preferred embodiment, the support web may also be extruded onto the extruded trim bar profile, or, combinedly, be manufactured in a single process step by means of a multi-component extrusion process. For example, the trim bar profile and/or the support web may be manufactured from a thermoplastic, e.g. PVC, or another suitable plastic material. For example, the trim bar profile may be manufactured by mono extrusion. The support web may be subsequently connected to it or extruded, for example. The trim bar profile may also be manufactured together with the support web by means of co-extrusion. In alternative embodiments, however, the trim bar profile may also be manufactured from a composite material such as a fibre-reinforced plastic or the like, for example a carbon-fibre-reinforced plastic.

According to a further embodiment, the trim bar profile may be C-shaped. Each of the legs of the "C" shape may be adapted as a fixing leg, while the corresponding other leg functions as a support leg. A nearly C-shaped design of the trim bar profile is particularly simple to install. For this purpose, the vehicle trim bar may, for example, be slid in and/or inserted into the channel and fixed to the vehicle structure using the fixing leg, e.g. by means of fixing openings and/or mounting brackets, or the like, provided for this purpose. If the length of the support web has previously been adapted to the depth of the channel, e.g. by cutting to length, the vehicle trim bar is automatically sitting on the channel bottom, and covers the channel in an accurately fitting manner with the vehicle structure.

According to another embodiment, the trim bar profile may be adapted with a trim bar core and a trim bar coating. The trim bar core may be, at least partially, embedded in the trim bar coating. In particular, the trim bar core may be completely embedded in the trim bar coating. In alternative embodiments, however, the trim bar core may also only be partially coated. For example, a trim bar profile which is open on one side may be provided, in which the trim bar core on one side of the trim bar profile remains open towards the outside. In a preferred exemplary embodiment, the trim bar profile may have an open trim bar core on a visible area facing away from the vehicle. In another preferred exemplary embodiment, the trim bar profile may have an open trim bar core on an inner surface facing the vehicle opposite from the visible area. The trim bar coating may function as the structural core of the trim bar profile providing stability and strength. The trim bar coating, on the other hand, may be manufactured from a material that is as light as possible and yet resistant to wear and tear. In addition, the trim bar coating itself may be coated with a varnish, paint, protective layer, etc. to ensure temperature resistance, fluid repellency, and durability. In alternative embodiments, however, the trim bar profile may also consist entirely or substantially entirely of one material, e.g. a metal material, e.g. aluminum or a plastic material.

For example, the trim bar core may contain or be manufactured from a metal material, e.g. a metal, a metal alloy or a metallic material combination. The trim bar coating may be manufactured from or may comprise a plastic material, e.g. a plain plastic material.

According to another embodiment, sealing lips may be formed on both sides of the trim bar profile along the longitudinal direction of the vehicle trim bar. The sealing lips may, for example, be extruded onto the trim bar profile. In further exemplary embodiments, the sealing lips may be bonded to the material, e.g. using an adhesive. In a preferred exemplary embodiment, the sealing lips may consist of and/or contain a polymer, in particular an elastomer, or another suitable plastic material, in particular a soft plastic, e.g. a thermoplastic and/or a silicone, etc. The sealing lips not only have a sealing function, but may also compensate for tolerances, and may absorb pressure loads or any loads in general. In interaction with the support web, defects or inaccuracies in the vehicle structure, e.g. of a body, or in the fixing arrangement may be compensated for or absorbed.

According to a further embodiment, the fixing leg may be adapted with at least one latching arm for, in particular, releasably fixing in at least one mounting bracket. According to this embodiment, the vehicle trim bar may be attached by simply inserting the latching arm into an opening or receptacle provided for this purpose, e.g. on at least one mounting bracket. The assembly according to this embodiment is therefore particularly fast and simple to implement. Alternatively or additionally, other positive-locking, friction-locking, and/or material-locking connection techniques may also be used in order to attach the vehicle trim bar by means of the fixing leg.

According to another embodiment, the vehicle trim bar may be adapted as a roof trim bar to cover a channel in the vehicle structure.

According to another embodiment, the vehicle trim bar may be attached to a channel wall of the channel by means of the fixing leg. In a preferred exemplary embodiment, corresponding attachment openings, attachment receptacles or the like may be formed in the channel wall into which the fixing leg may be inserted and locked, for example in the manner of a latching arm. In an alternative exemplary embodiment, one or more mounting brackets may be attached to the channel wall to retain the fixing leg, e.g. by clinching, welding, or another rivet- and drill-free process.

According to another embodiment, the vehicle structure may at least have one mounting bracket in the channel. The at least one mounting bracket may retain the fixing leg, in particular in a detachable/releasable manner. For example, such mounting brackets may be manufactured from metal material, a metal alloy, or a metallic material combination, or may comprise such a material.

According to a further embodiment, at least one mounting bracket may be clinched and/or welded to the vehicle structure or the like. In principle, other joining techniques that do not use rivets and drill holes, but which provide, at the same time, durable joints, may also be used, and which joining techniques do not cause a weakening of the vehicle structure in as much as possible. In a preferred exemplary embodiment, at least one mounting bracket may be attached to the vehicle structure by clinching. In another preferred exemplary embodiment, at least one mounting bracket may be friction welded to the vehicle structure.

According to another embodiment, the support web may project from the channel bottom substantially in a normal direction to the channel bottom.

According to another embodiment, the vehicle trim bar may cover the channel in an accurately fitting manner. In addition, the channel may be sealed by sealing lips arranged on the vehicle trim bar.

The above embodiments may be combined with each other in any sensible way. In particular, each of the embodiments comprising a sealing profile may also be applied to the sealing of closable openings of most various types.

Further possible embodiments according to the present invention may also include combinations of features according to the present invention described before or in the following with respect to exemplary embodiments, but which are not explicitly mentioned. In particular, the skilled person will also add individual aspects as improvements or additions to the respective basic embodiment of the present invention.

BRIEF DESCRIPTION OF THE DRAWING

The present invention will be explained in more detail below using the examples given in the schematic Figures of the drawing, in which:

FIG. 1 is a schematic cross-sectional view of a fixing arrangement comprising a vehicle trim bar according to an embodiment of the present invention.

The enclosed figures in the drawing are intended to provide a further understanding of the embodiments in which the present invention was carried out. They illustrate exemplary embodiments and provide an explanation of principles and concepts of the present invention when taken in conjunction with the description. Further embodiments and many of the advantages mentioned become obvious with respect to the drawings. The elements illustrated in the drawings are not necessarily shown to scale.

In the figures of the drawing, like elements and features having the same function and effect are indicated with similar reference signs, unless otherwise specified.

DESCRIPTION OF THE EMBODIMENTS

FIG. 1 shows a schematic cross-sectional view of a fixing arrangement 10 comprising a vehicle trim bar 1 according to an embodiment of the present invention.

In the fixing arrangement 10, a channel 9 in a vehicle structure 7 of a vehicle 100, e.g. a motor vehicle, is covered by a vehicle trim bar 1 in an accurately fitting manner. For example, channel 9 may be a roof gutter/drip rail, roof ditch and/or roof channel or the like formed in or on the roof of a motor vehicle. In this particular exemplary embodiment, the vehicle structure 7 is adapted as a roof structure, comprising a channel 9, for example, representing a roof channel between a roof panel and a side panel. In this example, the vehicle trim bar 1 thus functions as a roof trim bar or roof trim strip for covering the channel. However, in the present embodiment the roof trim bar is to be understood as an example only. In principle, the vehicle trim strips according to the present invention may be used for covering various recesses, grooves, ditches, gutters, channels, joints, or gaps in a vehicle structure. Furthermore, these solutions are not limited to motor vehicles, but may also be applied at various vehicles, and in all areas of the transportation industry, for example road vehicles, rail vehicles, aircraft or watercraft vehicles.

The basic body of the vehicle trim bar 1 is a trim bar profile 11 having a substantially C-shaped cross-section. The trim bar profile 11 comprises a trim bar core 2 manufactured from metal material, e.g. aluminum, and a trim bar coating 3 manufactured from plastic material, e.g. PVC, in which the trim bar core 2 is embedded. In principle, the trim bar profile 11 may also be coated with a protective layer, lacquer or similar (not shown here). In order to cover the channel 9 in an accurately fitting manner, sealing lips 12 manufactured from a soft plastic are provided on both sides of the trim bar profile 11 in the longitudinal direction, which function to compensate for tolerances and pressure loads.

In the exemplary embodiment, the trim bar core 2 is fully embedded within the trim bar coating 3. In other words, the trim bar core 2 is covered by the trim bar coating 3 both on a visible area 16 of the trim bar profile 11 facing away from the vehicle and on an inner surface 17 of the trim bar profile 11 facing towards the vehicle. In alternative embodiments, however, the trim bar core 2 may also be coated only partially, wherein the trim bar core 2 may, for example, remain open i.e. uncovered on the visible area 16 and/or the inner surface 17. Configurations without a trim bar coating 3 may also be provided, wherein the trim bar profile 11 is manufactured completely from one material, e.g. aluminum or plastic material.

One of the legs of the "C" shape of the trim bar profile 11 is adapted as a fixing leg 5 for attaching the vehicle trim bar 1 to the vehicle structure 7 within the channel 9. For this purpose, the fixing leg 5 is provided with one or more latching arms 13, by means of which the vehicle trim bar 1 may be attached to the vehicle structure 7. For this purpose, one or more mounting brackets 8 are each attached to a channel wall 15 of the channel 9, which are adapted to retain the latching arms 13 in a releasable manner. Upon assembly, the vehicle trim bar 1 may simply be inserted or slid into the channel 9, and the latching arms 13 may be inserted into the mounting brackets 8 and locked or latched in place. The mounting brackets 8 may, for example, be manufactured from a metal material such as a metal, a metal alloy, and/or a metallic material combination. For example, the mounting brackets 8 may be manufactured from aluminum. Here, the mounting brackets 8 may, for example, be attached to the channel wall 15 without having to apply drill holes or riveted joints which would otherwise lead to a weakening of the structure. It is to be understood, that other joining techniques and processes may also be applied, e.g. friction welding, and so on The other leg of the "C" shape of the trim bar profile 11 is adapted as a support leg 4 for supporting the vehicle trim bar 1 on a channel bottom 14 of channel 9. For this purpose, the support leg 4 comprises a support web 6 manufactured from a heat-resistant plastic material, e.g. PVC at the same time, which extends along a longitudinal direction of the vehicle trim strip 1 and projects approximately at a right angle from the trim strip profile 11, and which also rests at a right angle on the channel bottom 15 of the channel 9. The support web 6, for example, may be extruded onto the trim bar profile 11. It is the purpose of the support web 6 to position the vehicle trim bar 1 in the desired position within the channel 9 above the channel bottom 15. At the same time, support web 6 functions as a stabilizer against pressure loads acting on vehicle trim bar 1. Clips and/or spacers which are used conventionally may be avoided completely according to the present embodiment. Due to the use of plastic material, such a support web 6 may easily be cut to the right size or may be shortened depending on the channel geometry/dimensions, and may thus be easily adjusted in height with respect to the channel bottom 15. For example, the support web 6 may be manufactured with excess length, e.g. a length of about 35 mm. In the example shown in FIG. 1, the channel 9 may then have a depth of about 30 mm, for example. For an accurately fitting assembly of the vehicle trim bar 1, the support web 6 may then simply be cut to the correct length depending on the desired configuration, i.e. from originally 35 mm to 30 mm, e.g. by water jet cutting, punching or a similar suitable process. Upon application on a differently configured vehicle structure, e.g. comprising a channel depth of 20 mm, the vehicle trim bar 1 may be cut to length accordingly. As a result, a vehicle trim bar 1 comprising a standard support web 6 may be applied at variously dimensioned body shells and channel geometries. As mentioned above, supporting the trim bar is achieved only by means of the height-variable support web 6, which is cut to length depending on the requirements of the body shell. Additional clips and/or spacers are therefore not required. The assembly of the illustrated embodiment is thus considerably simplified when compared to conventional solutions, and thus the likelihood of faults during assembly is reduced. Therefore, according to the present invention cycle times and manufacturing costs may be reduced.

Although the present invention has been fully described above with respect to preferred exemplary embodiments, the present invention shall not be limited by the preferred exemplary embodiments, but may be modified in many ways. In the above detailed description, for example, some features have been combined in one or more of the exemplary embodiments in order to provide a clear explanation of the principles of the present invention. However, it is to be understood that the above description is only of illustrative nature, and not limiting, and should encompass all of the alternatives, modifications, and equivalents of the various features and embodiments. Many other exemplary embodiments will be immediately obvious to the person skilled in the art on the basis of his or her technical knowledge in light of the above description.

REFERENCE SIGNS LIST

1 Vehicle trim bar
2 Trim bar core
3 Trim bar coating
4 Support legs
5 Fixing legs
6 Support web
7 Vehicle structure
8 Mounting bracket
9 Channel
10 Fixing arrangement
11 Trim bar profile
12 Sealing lip
13 Latching arm
14 Channel bottom
15 Channel wall
16 Visible area
17 Inner surface
100 Vehicle

The invention claimed is:

1. A vehicle trim bar for covering a channel in a vehicle structure, comprising:
a trim bar profile which includes a fixing leg configured for fixing the vehicle trim bar to a channel wall within the channel to the vehicle structure and a support leg, separate from said fixing leg, configured for supporting the vehicle trim bar on a channel bottom of the channel separate from the channel wall,
wherein the support leg is formed with a support web which projects from the trim bar profile and extends along a longitudinal direction of the vehicle trim bar, the support web being configured and arranged to provide the only support of the vehicle trim bar on the channel bottom, and the support web being formed of a plastic material.

2. The vehicle trim bar according to claim 1, characterized in that the support web is configured to have an alterable height.

3. The vehicle trim bar according to claim 1, characterized in that the support web is extruded onto the trim bar profile.

4. The vehicle trim bar according to claim 1, characterized in that the supporting web projects substantially at a right angle from the trim bar profile.

5. The vehicle trim bar according to claim 1, characterized in that the trim bar profile is manufactured as an extrusion part and/or extruded part.

6. The vehicle trim bar according to claim 1, characterized in that the trim bar profile is substantially C-shaped.

7. The vehicle trim bar according to claim 1, characterized in that the trim bar profile includes a trim bar core and a trim bar coating, the trim bar core being at least partially embedded in the trim bar coating.

8. The vehicle trim bar according to claim 7 characterized in that the trim bar core comprises a metal material and the trim bar coating comprises a plastic material.

9. The vehicle trim bar according to claim 1, characterized in that sealing lips are formed on both sides of the trim bar profile so as to extend along the longitudinal direction of the vehicle trim bar.

10. The vehicle trim bar according to claim 1, characterized in that the fixing leg includes at least one latching arm (13) configured for fixing in at least one mounting bracket.

11. The vehicle trim bar according to claim 1, characterized in that the vehicle trim bar is adapted as a roof trim bar configured for covering a roof channel of the vehicle structure.

12. A fixing arrangement for a vehicle comprising:
a vehicle trim bar according to claim 1, and
a vehicle structure comprising a channel,
wherein the vehicle trim bar is fixed to the vehicle structure by means of the fixing leg within the channel, and wherein the support leg supports the vehicle trim bar by means of the support web on a channel bottom of the channel.

13. The fixing arrangement according to claim 12, characterized in that the vehicle structure comprises at least one mounting bracket in the channel which retains the fixing leg in place.

14. The fixing arrangement according to claim 13, characterized in that the at least one mounting bracket is clinched and/or welded fixedly to the vehicle structure.

15. The fixing arrangement according to claim 12, characterized in that the supporting web rests substantially at right angles on the channel bottom.

16. The fixing arrangement according to claim 12, characterized in that the vehicle trim bar covers the channel in a fitting manner.

17. A motor vehicle having a fixing arrangement according to claim 12.

* * * * *